(12) United States Patent
Yuan et al.

(10) Patent No.: US 9,274,789 B2
(45) Date of Patent: Mar. 1, 2016

(54) IN-APPLICATION UPGRADE METHOD FOR OPTICAL MODULE FIRMWARE NOT BREAKING SERVICE

(71) Applicant: WUHAN TELECOMMUNICATION DEVICES CO., LTD., Wuhan, Hubei (CN)

(72) Inventors: Tao Yuan, Wuhan (CN); Xianghong Yu, Wuhan (CN); Xuguang Chen, Hubei (CN)

(73) Assignee: WUHAN TELECOMMUNICATION DEVICES CO., LTD., Wuhan (CN)

( * ) Notice: Subject to any disclaimer, the term of this patent is extended or adjusted under 35 U.S.C. 154(b) by 0 days.

(21) Appl. No.: 14/403,178

(22) PCT Filed: Dec. 17, 2012

(86) PCT No.: PCT/CN2012/086740
§ 371 (c)(1),
(2) Date: Nov. 22, 2014

(87) PCT Pub. No.: WO2014/029181
PCT Pub. Date: Feb. 27, 2014

(65) Prior Publication Data
US 2015/0154017 A1    Jun. 4, 2015

(30) Foreign Application Priority Data
Aug. 21, 2012   (CN) .......................... 2012 1 0298405

(51) Int. Cl.
*G06F 9/44*     (2006.01)
*G06F 9/445*    (2006.01)
(52) U.S. Cl.
CPC ....................... *G06F 8/67* (2013.01)

(58) Field of Classification Search
CPC ....................................................... G06F 8/67
USPC ............................................................ 717/168
See application file for complete search history.

(56) References Cited

U.S. PATENT DOCUMENTS

| 6,532,537 | B1 * | 3/2003 | Chen et al. ................. 713/2 |
| 7,249,353 | B2 * | 7/2007 | Zarco ....................... G06F 8/65 717/170 |

(Continued)

FOREIGN PATENT DOCUMENTS

| CN | 1752933 A | 3/2006 |
| CN | 101271396 A * | 9/2008 |

(Continued)

OTHER PUBLICATIONS

AN533 "Modular Bootloader Framework for Silicon Labs C8051FXXX Microcontrollers", 2010, Silicon Labs.*

(Continued)

*Primary Examiner* — Wei Zhen
*Assistant Examiner* — Junchun Wu
(74) *Attorney, Agent, or Firm* — Maschoff Brennan

(57) ABSTRACT

An in-application upgrade method is used for optical module firmware not breaking a service. A storage area for internal programs of an optical module is divided into two areas which are respectively used for storing upgrade and application programs, and is divided into an area for backing up an interrupt vector table of a Boot program. An upper computer is in communication with the optical module. The interrupt vector table is switched, and the jump between the Boot program and the application program is achieved. The method includes extracting the contents of firmware, entering a download mode and updating the firmware. The original firmware is erased, and new firmware is written. An application mode is entered, the upper computer sending an exit command from the download mode. The upgrade program exits and a new application program is executed. The optical module operates normally without interruption.

6 Claims, 5 Drawing Sheets

(56) References Cited

U.S. PATENT DOCUMENTS

| | | | |
|---|---|---|---|
| 7,356,727 B1* | 4/2008 | McGhee et al. | 714/2 |
| 7,376,943 B2* | 5/2008 | Lu | G06F 11/1433 717/168 |
| 7,480,904 B2* | 1/2009 | Hsu | G06F 8/65 717/168 |
| 8,111,999 B2* | 2/2012 | Ekkizogloy | H04B 10/40 398/135 |
| 2004/0083469 A1* | 4/2004 | Chen | G06F 8/665 717/168 |
| 2004/0143828 A1* | 7/2004 | Liu | G06F 8/665 717/168 |
| 2005/0120343 A1 | 6/2005 | Tai et al. | |
| 2006/0206674 A1* | 9/2006 | Chang | G06F 3/0608 711/154 |
| 2010/0011134 A1* | 1/2010 | Brockmann et al. | 710/14 |
| 2010/0180265 A1* | 7/2010 | Tsai | G06F 9/4426 717/168 |
| 2010/0325622 A1* | 12/2010 | Morton | 717/168 |

FOREIGN PATENT DOCUMENTS

| | | | |
|---|---|---|---|
| CN | 101950253 A | | 1/2011 |
| CN | 102314369 A | | 1/2012 |
| CN | 102722384 A | * | 10/2012 |
| CN | 103248424 A | * | 8/2013 |

OTHER PUBLICATIONS

Hsueh et al. "Smooth Upgrade of Existing Passive Optical Networks With Spectral-Shaping Line-Coding Service Overlay", Sep. 2005, IEEE.*

* cited by examiner

IN-APPLICATION UPGRADE METHOD FOR OPTICAL MODULE FIRMWARE NOT BREAKING SERVICE

FIELD OF THE INVENTION

The present invention relates to an in-application upgrade method, and in particular, to an in-application upgrade method for optical module firmware not breaking a service, which may save the labor cost and the operation cost.

BACKGROUND OF THE INVENTION

As an important component part-optical module in the existing optical communication industry, its production capacity is increasing, its process and control technology become more and more complicated. With the diversification of business, optical communication system providers put forward higher requirements to optical module manufacturers. The system providers also particularly concern about the in-application upgrade technology of the optical module firmware in this context. For example, if an online upgrade technology is not used in the existing optical module, the system providers will do performance adjustment of the optical module, or if design flaws are found in the optical module firmware, the usual practice is that the optical module manufacturers recall the optical modules and use a professional download tool to re-download the firmware after opening its shell, which not only consumes a lot of manpower and transportation costs, but also easily causes damage to the optical module. Currently, the control parts of the relatively high side optical module are mostly achieved on the basis of an ARM-core MCU (Micro Control Unit). Some well-known MCU manufacturers at home and abroad also provide in-application upgrade technology (IAP) of the MCU firmware, but the in-application upgrade technology applied in the field of the optical module still has certain obvious deficiencies, of which the biggest problem is that the reset operation of the MCU is required for the firmware provided by the MCU manufacturers in the updated scheme of application before or after upgrading the firmware without exception. In this way, the service of the optical module in the normal communication is broken to cause unpredictable risk for the operators. Meanwhile, the in-application upgrade technology provided by the majority of MCU manufacturers downloads and updates the firmware with a serial port or a network interface, which is also unacceptable for the smaller optical module.

SUMMARY OF THE INVENTION

For this purpose, the primary purpose of the present invention is to provide an in-application upgrade method for optical module firmware not breaking a service, which achieves seamless communication.

To achieve the above purpose, the present invention provides an in-application upgrade method for optical module firmware not breaking a service. A storage area for internal programs of an optical module is divided into two areas which are respectively used for storing an upgrade program and an application program, and is divided into a special area for backing up an interrupt vector table of a Boot program; an upper computer is in communication with the optical module; the interrupt vector table is switched; and the jump between the Boot program and the application program is achieved through a program pointer. The method specifically comprises the following steps.

Step 1: Extracting the contents of the firmware;

Step 2: Entering a download mode;

Step 3: Erasing original firmware;

Step 4: Writing new firmware;

Step 5: Entering an application mode, the upper computer sending a command of exiting from the download mode after data and a code pass verification, exiting from the upgrade program and turning to execute a new application program, and the optical module operating normally.

The step 1 specifically comprises the following sub-steps, the optical module executes the application program when the system is in the process of operating normally, and the upper computer sends a command of entering the download mode when needing to update the module firmware.

A corresponding status indicator is provided in spite of entering either the application program or the Boot program; the upper computer reads the indication to judge the status of the program, notifies an operator of executing either the Boot program or the application program by an existing MCU (Micro Control Unit) of the optical module, and may also send a command of switching between the two statuses in a free manner; after entering the step 2, the MCU switches the existing interrupt vector table into a Boot program interrupt vector table if determining to upgrade the optical module firmware and the program pointer turns to point to the Boot program.

In all upgrade steps, the status of a register partially controlling the optical module and an I/O port remains unchanged, so that the basic functions of the optical module, such as transmission and reception, are sustained not to affect the normal operation of the optical module.

In the step 3, the upper computer sends a command of erasing the appointed area in the optical module and delaying until the erasure is completed in the download mode.

In the step 4, the upper computer sends a writing command, loads the code of the new firmware and writes into the appointed storage area of the optical module, and the step 5 is entered after the data and the code pass the verification by reading the written data.

The optical module and the upper computer execute the command transfer, update and download of the firmware and model switching through an I2C bus, and the adopted I2C address and the read-write mode are the same as the address of the communication protocol of the optical module.

In the overall process, the MCU and the upper computer execute the command transfer and the update and download of the firmware through the I2C bus; the switching between the application program and the upgrade program is controlled by sending the command through the upper computer; the MCU is not required to reset; the status of a register partially controlling the optical module and the I/O port remains unchanged, so that the basic functions of the optical module, such as transmission and reception, are sustained not to interrupt the work of the optical module.

DETAILED DESCRIPTION OF THE PREFERRED EMBODIMENTS

For further understanding on the method, the present invention is further described hereinafter with reference to the following attached drawings and the preferred embodiments for details.

In the present invention, the features of the storage area of the MCU are adopted. A storage area for the internal programs of the MCU is divided into two areas which are respectively used for storing the upgrade program and the application program. A 51-core MCU is divided into a special area for backing up an interrupt vector table of a Boot program; an ARM-core MCU switches the interrupt vector table of the Boot program and the interrupt vector table of the application program as required through re-image operation; and the program jump is achieved through a program pointer. The MCU is controlled to freely switch between the two programs through a mode of external command by means of the re-positioning technology of the interrupt vector table, while the existing status of certain registers controlling the optical module, external interfaces and I/O ports in the high side area of the MCU storage area may be changed or not changed to realize the design concept. If needing to upgrade the optical module firmware, communication system providers or tele-communication operators only require for downloading the new optical module firmware provided by the module manufacturer with update software.

The implementation method of the upgrade program is mainly to achieve the communication between the upper computer and the optical module, the switching of the interrupt vector table and the jump between the Boot program and the application program. The allocation of the storage space is set according to the size of each program code in a compiler.

Figure 1:
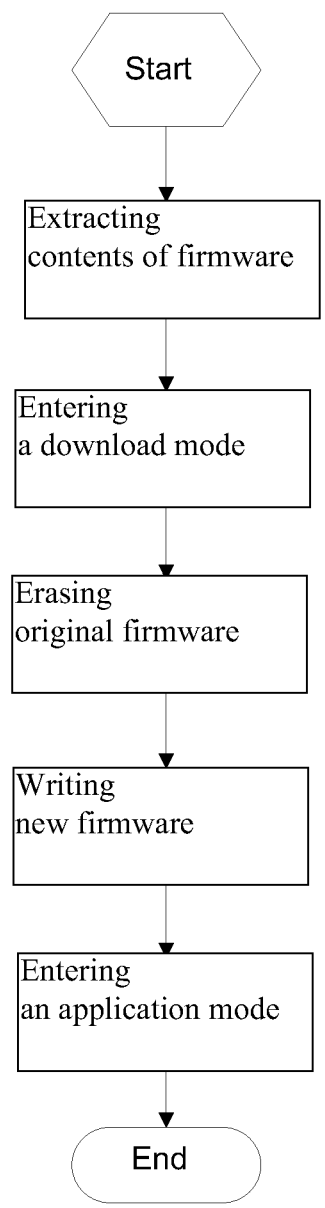
FIG. 1 is a step diagram of an in-application upgrade method for optical module firmware not breaking a service in the present invention.
Figure 2:
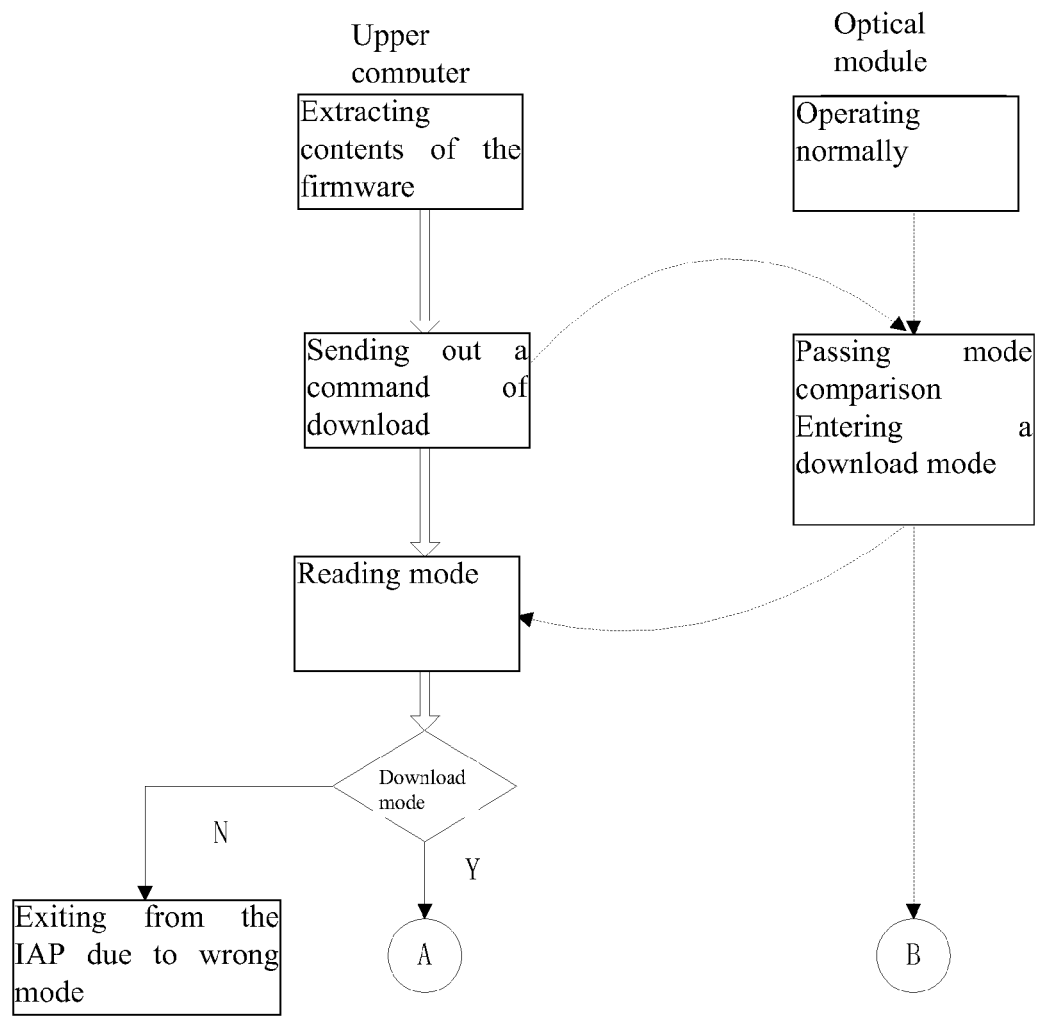
FIG. 2 is a flow diagram of step 1 and step 2 in the present invention.
Figure 3:
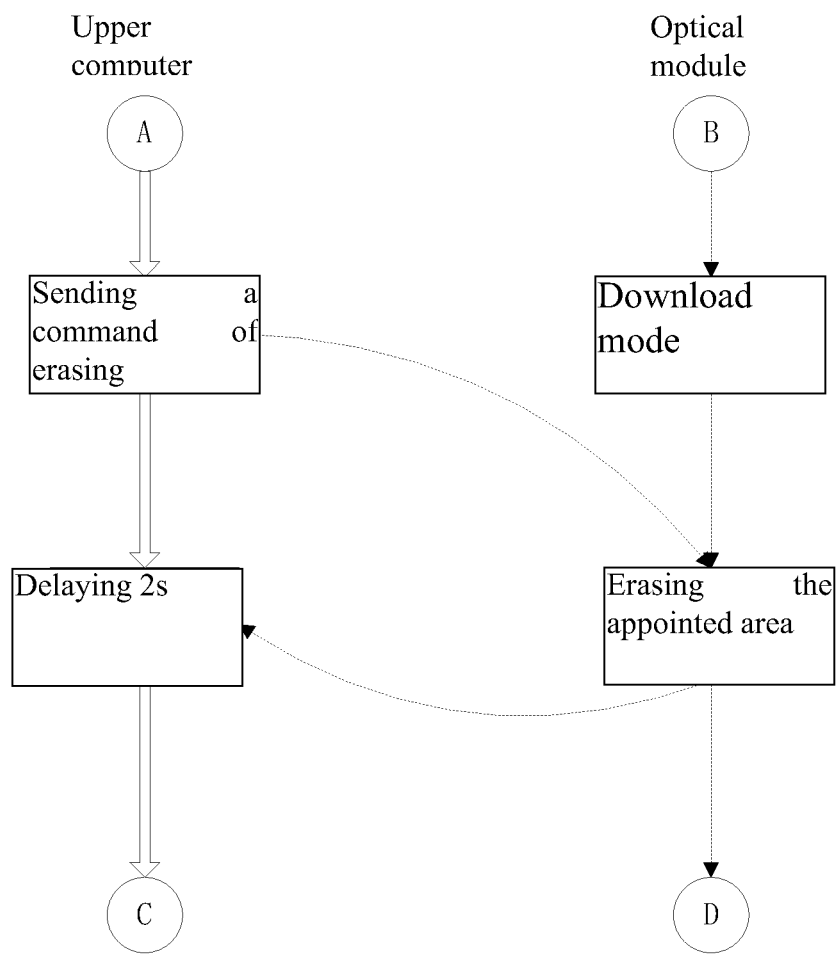
FIG. 3 is a flow diagram of step 3 in the present invention.
Figure 4:
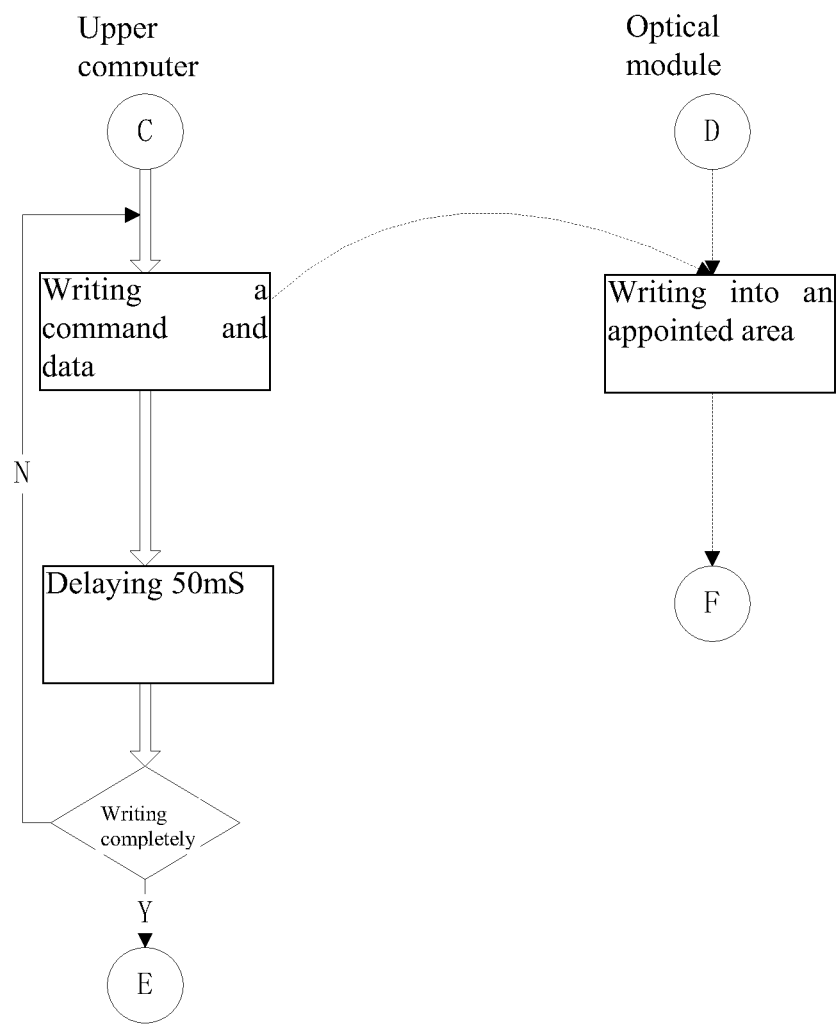
FIG. 4 is a flow diagram of step 4 in the present invention.
Figure 5:
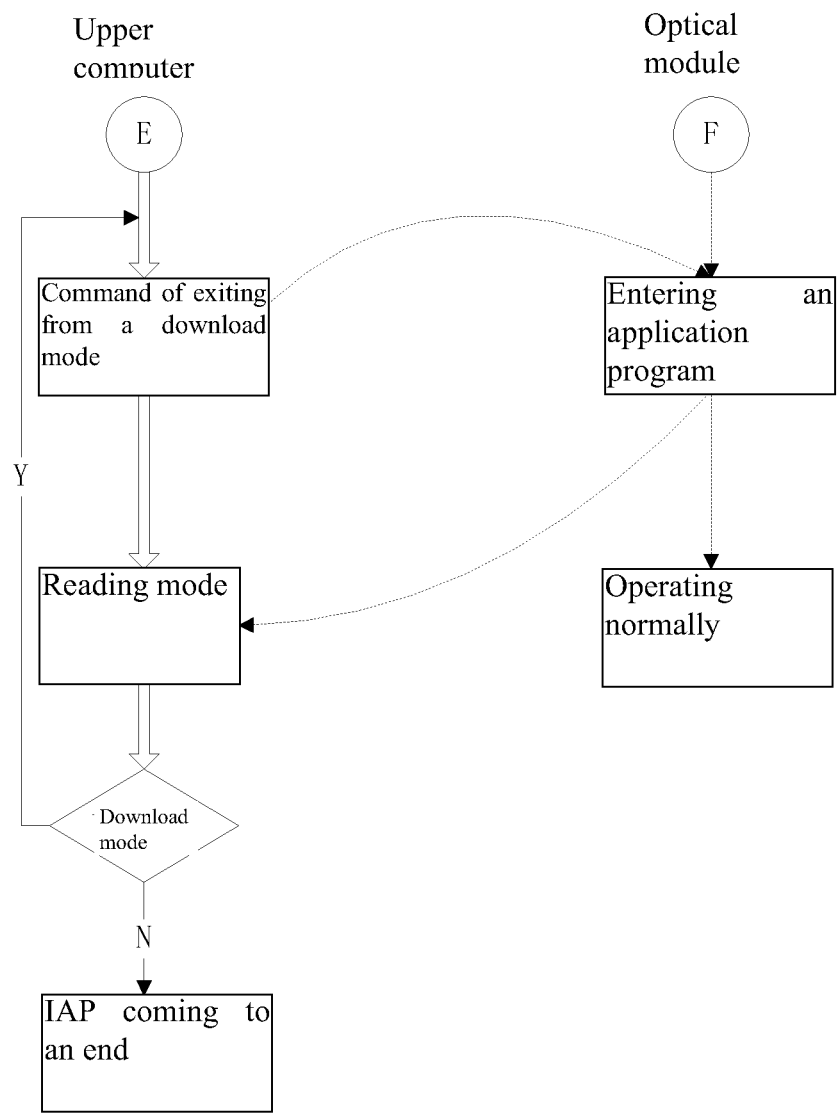
FIG. 5 is a flow diagram of step 5 in the present invention.

As shown in FIG. 1 to FIG. 5, the in-application upgrade method for the optical module firmware not breaking the service comprises the following steps of:

Step 1, extracting the contents of the firmware, wherein the MCU executes the application program when the system is in the normally operating process, and the upper computer sends a command to inquire the current version of the firmware to judge whether needing to update new firmware when needing to update the module firmware;

Format of Download Command
S, [A2h], [60h], [4Ch], [4Fh], [41h], [44h], P . . . Command 1
S, [A2h], [60h], c, v, m, d, P . . . Command 2
[A2h] is an I2C write address and [60*h*] is the address of the register.
[4Ch], [4Fh], [41h] and [44h] represent command "LOAD".
The value of c is appointed by WTD according to the model. Do not download until the module comparison is consistent.
The value of v is appointed by WTD according to the model. Do not download until the module comparison is consistent.
The value of m is appointed by WTD according to the model. Do not download until the module comparison is consistent.
The value of d is appointed by WTD according to the model. Do not download until the module comparison is consistent.
S represents an I2C start character and P represents an I2C stop character.
Format of Mode Read Command
S, [A2h], [7Fh], P, S, [A3h], [read], P
[A2h] is an I2C write address, [A3h] is an I2C read address, [7Fh] is the address of the register.
[read] is a read mode value.
[read] result is 66h, which represents the download mode and the other values represent the application mode.
S represents an I2C start character and P represents an I2C stop character.

Step 2, entering the download mode, wherein the module mode comparison is performed by the read mode when judging and needing to update the firmware, the download mode is entered after passing the mode comparison; if the mode is wrong, the in-application upgrade of the firmware quits; after entering the download mode, the MCU switches the existing interrupt vector table into the Boot program interrupt vector table, the program pointer turns to the Boot program, various control registers of the MCU and an IO register remain unchanged, so as not to affect the normal operation of the module;

Step 3, erasing the original firmware, wherein the upper computer sends a command of erasing the appointed area in the optical module and delaying until the erasure is completed in the download mode.

Format of Command of Erasing a Section
S, [A2h], [E8h], [08h], [77h], P
[A2h] is an I2C write address and [E8h] is a command of erasing the section.
[08h] represents a start address 512B*8 (1000h).
[77h] represents an end address 512B*119 (the maximum address of the section with EE00h is EFFFh).
S represents an I2C start character and P represents an I2C stop character;

Step 4, writing the new firmware, wherein the upper computer sends a writing command, loads the code of the new firmware and writes into the storage area appointed by the MCU, the written data is read by the read command and is compared with the writing data, and the step 5 is executed after the data and the code pass the verification;

Format of Writing Data
S, [A2h], [9Bh], [CDh], [12h], [34h] . . . , [EFh], P
[A2h] is an I2C write address.
[9Bh] and [CDh] are the start stresses of the writing data, which are located in 81000h+9BCDh=8ABCDh. The maximum address format is "[DFh] and [FFh]" corresponding to the range of available address from 81000h to 8EFFFh.
[12h], [34h], . . . , [EFh] represent the written data, among which the low-address byte is at the front and at most 32 Bytes are written once.
S represents an I2C start character and P represents an I2C stop character;

Step 5, entering an application mode, wherein the upper computer sends a command of exiting from the download mode after data and a code pass verification, exites from the upgrade program and turns to execute a new application program, and the optical module operates normally.

Format of Command of Exiting from the Download Mode
S, [A2h], [E0h], [01h], [FFh], P
[A2h] is an I2C write address.
[E0h] and [01h] are commands of exiting from the download mode and entering the application program, corresponding address is located in 81000h+E001h=8F001h.

[FFh] or other non-zero values represent the jump of the enabled application program.

S represents an I2C start character and P represents an I2C stop character.

The first action of the new application program is to reset the interrupt vector table. In the overall process, the MCU and the upper computer execute the command transfer and the update and download of the firmware through the I2C bus; the switching between the application program and the upgrade program is controlled by sending the command through the upper computer; the MCU is not required to reset; thus the work of the optical module is not interrupted.

The MCU in the steps of the above method is the optical model. In addition, A, B, C, D, E and F in the attached drawings respectively represent the engagement among various steps.

The above mentioned is only the existing preferred embodiments of the present invention rather than limiting the scope of protection of the present invention.

What is claimed is:

1. An in-application upgrade method for optical module firmware comprising:
   extracting contents of firmware to a storage area, wherein the storage area is to store internal programs of an optical module, wherein the storage area is divided into two areas which are respectively used for storing an upgrade program and an application program, and is divided into a special area for backing up an interrupt vector table of a Boot program;
   entering a download mode;
   erasing original firmware;
   writing new firmware;
   entering an application mode, wherein entering the application mode comprises sending a command of exiting from the download mode after data and a code pass verification, exiting from an upgrade program and turning to execute a new application program, and an optical module operating normally;
   sending a corresponding status indicator in spite of entering either the application program or a Boot program;
   reading the indication to judge the status of the program;
   notifying an operator of executing either the Boot program or the application program by an existing MCU (Micro Control Unit) of the optical module;
   sending a command to switch between the two statuses; and
   after entering the download mode, switching the existing interrupt vector table into a Boot program interrupt vector table using a program pointer in response to determining to upgrade the firmware and the program pointer turns to point to the Boot program.

2. The in-application upgrade method of claim 1, wherein extracting the contents of the firmware comprises executing the application program when a system is operating normally, and sending a command of entering the download mode when needing to update the firmware.

3. The in-application upgrade method of claim 1, wherein the status of a register partially controlling the optical module and an I/O port remains unchanged, so that basic functions of the optical modules, such as transmission and remains unchanged, so that basic functions of the optical module, such as transmission and reception, are sustained not to affect the normal operation of the optical module.

4. The in-application upgrade method of claim 1, wherein erasing original firmware comprises sending a command to erase an appointed area in the optical module and to delay until the erasure is completed in the download mode.

5. The in-application upgrade method of claim 1, wherein writing new firmware comprises:
   sending a writing command;
   loading the code of the new firmware; and
   writing into an appointed storage area of the optical module, and wherein the application mode is entered after the data and the code pass the verification.

6. The in-application upgrade method of claim 1, wherein the optical module and the upper computer are configured to execute a command transfer, update and download of the firmware and model switching through an I2C bus, and an adopted I2C address and a read-write mode are the same as an address of a communication protocol of the optical module.

* * * * *